United States Patent [19]

Ocker et al.

[11] 4,343,445
[45] Aug. 10, 1982

[54] DUAL SPOOL SEAT BELT RETRACTOR WITH COMFORT FEATURE

[75] Inventors: Klaus F. Ocker, Fraser; Richard J. Jodts, Mt. Clemens; Robert C. Pfeiffer, Sterling Heights, all of Mich.

[73] Assignee: Allied Corporation, Morris Township, Morris County, N.J.

[21] Appl. No.: 89,648

[22] Filed: Oct. 29, 1979

[51] Int. Cl.³ .................. A62B 35/02; B65H 75/48
[52] U.S. Cl. ........................... 242/107.7; 280/802; 280/808
[58] Field of Search .......... 242/107.4 R, 107.4 E, 242/107.6, 107.7; 280/801–808; 297/474–480, 483, 484, 486

[56] References Cited

U.S. PATENT DOCUMENTS

| | | | |
|---|---|---|---|
| 3,880,379 | 4/1975 | Booth | 242/107.4 R |
| 4,002,311 | 1/1977 | Fisher et al. | 242/107.7 |
| 4,065,070 | 12/1977 | Pilarski et al. | 242/107.4 A |
| 4,135,683 | 1/1979 | Stephenson et al. | 242/107.4 A |
| 4,153,274 | 5/1979 | Rogers et al. | 242/107.7 X |
| 4,164,336 | 8/1979 | Higbee et al. | 242/107.4 A |

*Primary Examiner*—John M. Jillions
*Attorney, Agent, or Firm*—Roger H. Criss

[57] ABSTRACT

A dual spool seat belt retractor including a housing and lap and shoulder belt retractors mounted therein. Tension relieving means is provided for the shoulder belt retractor and is positioned in its inoperable position in response to release of energy stored in a release means due to rotation of the lap belt retractor in the extraction direction. Preferably, the tension relieving means is placed in its inoperable position in response to a predetermined number of revolutions of the lap belt retractor in the rewind direction.

8 Claims, 4 Drawing Figures

DUAL SPOOL SEAT BELT RETRACTOR WITH COMFORT FEATURE

DESCRIPTION

BACKGROUND OF THE INVENTION

1. Field of the Invention

This invention relates to a comfort feature for seat belt retractors, and particularly for dual spool seat belt retractors.

2. Description of the Prior Art

Seat belt retractors including separate spools for lap and shoulder belt retractors contained within a common housing are known. An example of such retractor is disclosed in U.S. Pat. No. 4,135,683 to Stephenson et al. It has been suggested to provide a comfort mechanism for the shoulder belt retractor of such a dual spool retractor in order to eliminate the amount of tension exerted by its associated rewind spring against the upper torso of the wearer. Devices for automatically disengaging a seat belt comfort mechanism are also known in which the comfort mechanism is disengaged upon opening of the vehicle door. This normally requires location of the retractor adjacent to the door of the vehicle. However, such door actuated disengagement mechanisms have a high degree of complexity and are costly. It would be desirable to provide a device which automatically disengages the comfort mechanism independent of door actuation so that the retractor need not be mounted in close proximity to the door. In addition, it would be desirable to automatically disengage the comfort mechanism to prevent webbing from being caught in the vehicle door.

SUMMARY OF THE INVENTION

In accordance with this invention, there is provided in a dual spool seat belt retractor including a housing, a lap belt retractor mounted in the housing and adapted to store a lap belt thereon, a shoulder belt retractor mounted in the housing and adapted to store a shoulder belt thereon, the retractors being rotatable in rewind and extraction directions, and rewind means associated with the retractors and normally exerting a rewind force urging the retractors towards the rewind direction, the improvement comprising:

tension relieving means operatively associated with the shoulder belt retractor and effective in an operable position to relieve the rewind force associated with the shoulder belt retractor and ineffective in an inoperable position to relieve such force; and release means operable to position the tension relieving means in its inoperable position in response to release of energy stored in the release means resulting from rotation of the lap belt retractor in the extraction direction.

Preferably, the release means is actuable to position the tension relieving means in its inoperable position in response to a predetermined number of revolutions of the lap belt retractor in the rewind direction and is also actuable to position the tension relieving means in its operable position in response to a predetermined number of revolutions of the lap belt retractor in the extraction direction. The release means preferably includes a step reduction gear mechanism to control actuation of the tension relieving means.

DESCRIPTION OF THE PREFERRED EMBODIMENT

Figure 1:
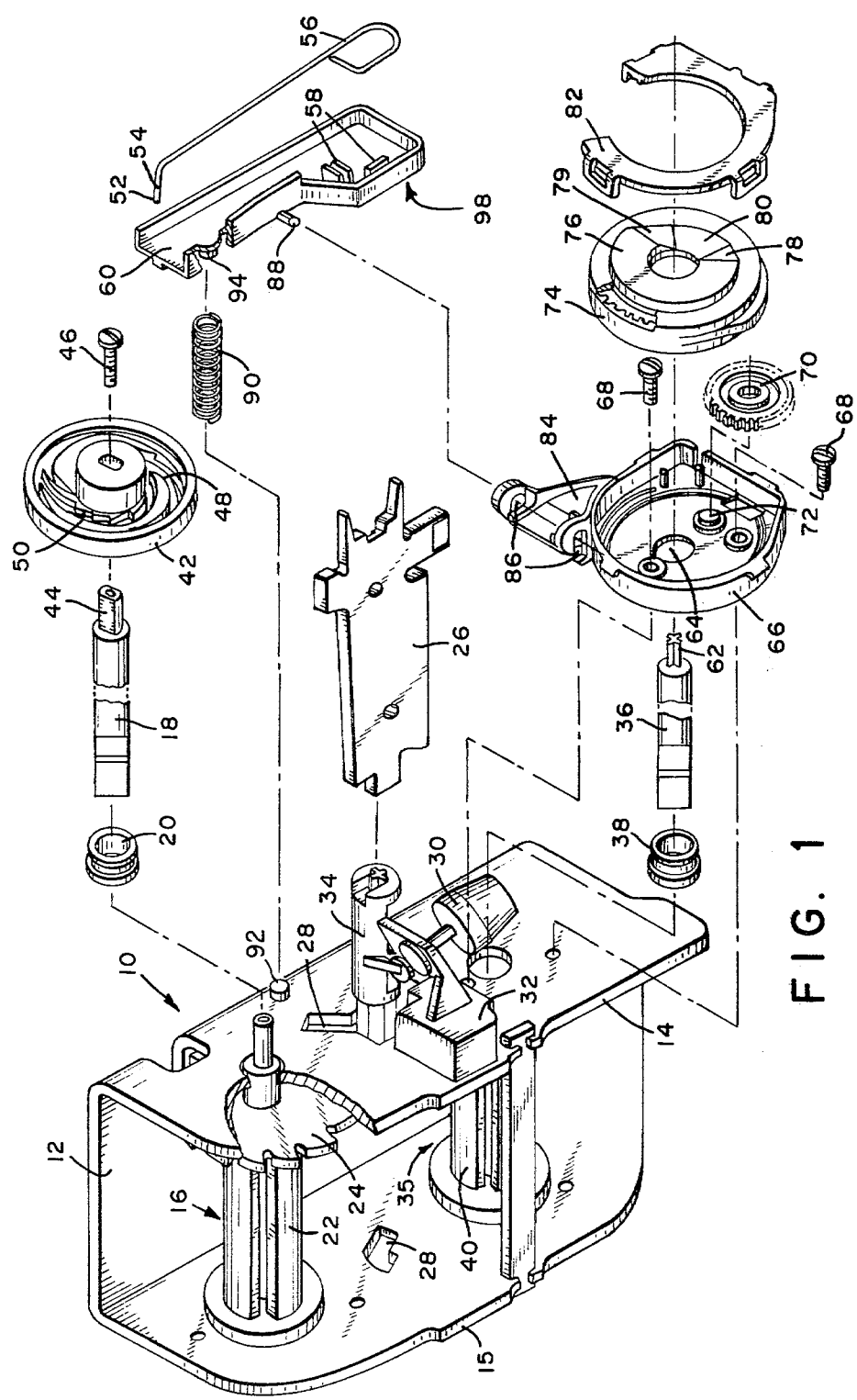
FIG. 1 is an exploded view of the dual seat belt retractor of this invention including the comfort feature.
Figure 2:
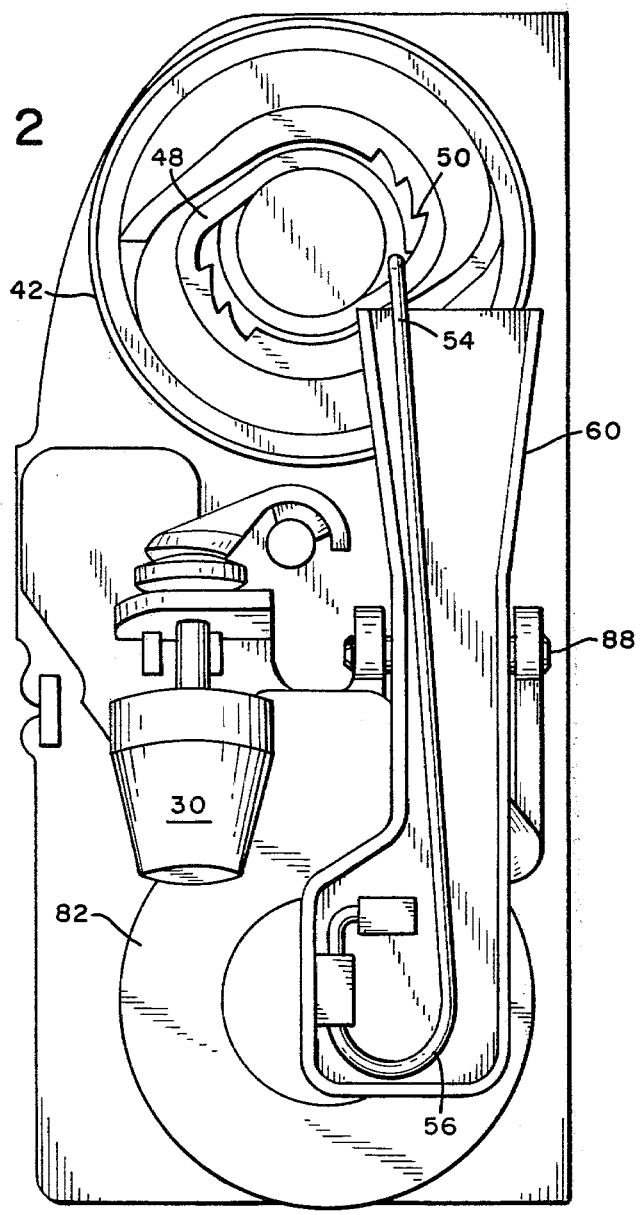
FIG. 2 is a side view of the retractor of FIG. 1.

With reference to the drawings, there is shown a dual spool retractor 10 including a U-shaped base having upstanding side flanges 14. A shoulder belt retractor 16 including a shaft 18 is journaled in bushing 20 for rotation in flanges 14 and 15 and a spool 22 mounted on shaft 18 is adapted to receive seat belt webbing (not shown). A locking gear 24 is mounted on shaft 18 interior of flange 14 and is adapted to be engaged by a locking pawl 26 pivotably mounted in openings 28 in flanges 14 and 15 in response to actuation by a pendulum 30 mounted in a carrier 32 on the exterior of flange 14 when the vehicle in which the retractor is mounted is subject to a deceleration force. A plastic extension 34 serves to transfer motion of the pendulum cap to pawl 26. Mounted below shoulder belt retractor 16 in flanges 14 and 15 is a lap belt retractor 35 including a shaft 36 journaled for rotation in bushing 38 in flange 14. A spool 40 is mounted on shaft 36 and is likewise adapted to receive seat belt webbing (not shown). Shaft 36 also carries a locking gear (not shown) which is likewise adapted to be engaged by locking pawl 26. Rewind springs (not shown) are mounted exteriorly of flange 15 and are coupled respectively to shafts 18 and 36 to bias the shafts in a rewind direction. The dual spool retractor as described above is more fully described in the aforementioned U.S. Patent, the disclosure of which is expressly incorporated herein by reference.

A plastic scroll plate 42 is mounted on a keyed extension 44 of shoulder belt retractor shaft 18 which extends exteriorly of 14. Screw 46 fixes scroll plate 42 for rotation with shaft 18. A plurality of tracks 48 and locking recesses (hooks) 50 are provided on the exterior surface of scroll plate 42. End 52 of spring follower 54 is adapted to be received in tracks 48 and hooks 50 in a manner disclosed, for example, in U.S. Pat. No. 4,002,311 to Fisher et al. to provide a tension elimination comfort mechanism to block scroll plate 42 and hence shaft 18 from rewind rotation due to the bias of the shoulder belt retractor rewind spring. Spring follower 54 has a looped end 56 which is received in channels 58 of a plastic spring rocker 60, with end 52 being biased towards the center of scroll plate 42.

A spur gear 62 is mounted on the end of lap belt retractor shaft 36 and extends through an opening 64 in a housing 66 which is mounted via screws 68 to the exterior of flange 14. A toothed idler gear 70 is mounted on a post 72 in housing 66 and its teeth mesh with the teeth of spur gear 62. An internally toothed ring gear 74 is retained within housing 66 and also meshes with idler gear 70. A gear train of this type is shown, for example, in U.S. Pat. No. 3,880,379 to Booth. The exterior surface of ring gear 74 has an outwardly extending cam protrusion 76 which extends almost circumferentially but terminates in inclined portions 78 and 79 which extend to a recessed or valley portion 80 on the exterior surface of ring gear 74. Cover 82 extends over housing 66.

An extension 84 of housing 66 includes recesses 86 which receives a lateral post 88 of spring rocker 60. Spring rocker 60 is thus pivotably mounted for movement towards and away from flange 14. Housing 66 may also contain a seat belt use indicating switch such as disclosed, for example, in U.S. Pat. No. 4,163,880 to Stephenson et al. A spring 90 extends between a post 92 on flange 14 and post 94 on spring rocker 60 to bias the upper portion of spring rocker 60 away from flange 14. Boss 96 on interiorly facing surface 98 of the lower end of spring rocker 60 is adapted to be in contact with cam portion 76 of ring gear 74 when seat belt webbing is extended away from lap belt retractor 35 and with valley portion 80 when seat belt webbing is fully or nearly fully stored on spool 40 of lap belt retractor 35.

Figure 3:
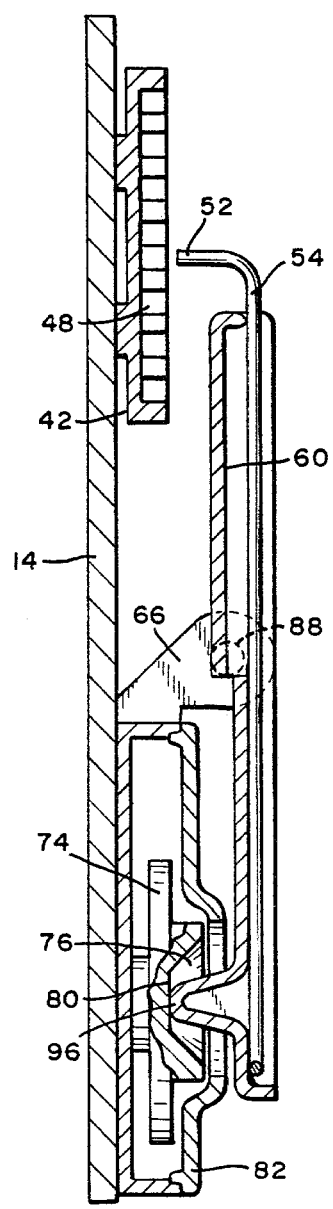
FIG. 3 is a view of a portion of the tension relieving mechanism in its inoperable position.
Figure 4:
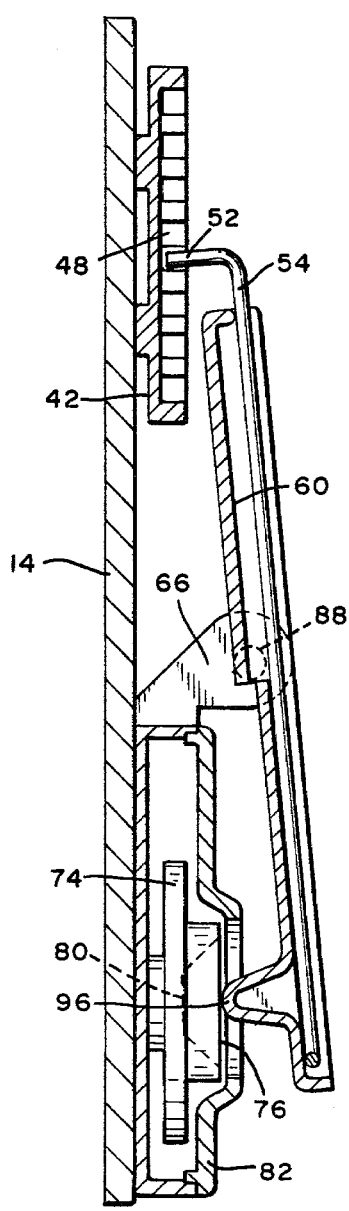
FIG. 4 is a view of a portion of the tension relieving mechanism in its operable position.

In operation of the above-described embodiment, when the lap and shoulder belts are in their normally stowed positions, boss 96 of spring rocker 60 is in contact with valley 80 on the exterior surface of ring gear 74 so that the upper portion of spring rocker 60 is pivoted away from scroll plate 42 due to the bias of its spring 90, as shown in FIG. 3. End 52 of spring follower 54 is thus held away from scroll plate 42 and the rewind spring associated with the shoulder belt retractor 16 is biasing the shoulder belt in the rewind direction. As the tap belt (and shoulder belt) is extended from its retractor due to the motion of the occupant pulling on a conventional slip tongue which is interfitted between the lap and shoulder belts portions (which constitute a continuous seat belt webbing), shaft 36 of lap belt retractor 35 rotates in an extraction direction which causes rotation of ring gear 74 in the same direction through the gear train completed by idler gear 70 and spur gear 62. Due to the gear ratios, ring gear 74 rotates only a small portion of a revolution for each revolution of spur gear 62. Boss 96 is riding within valley 80 when the lap belt retractor is initially extended. As additional webbing is extended from lap belt retractor 35 so that shaft 36 further rotates in the extraction direction and causes additional rotation of ring gear 74, boss 96 rides up ramp 78 and onto cam portion 76. For example, the gear ratios may be selected such that when about two wraps of lap belt webbing are removed from the lap belt retractor, ring gear 74 has rotated about ⅓ of a revolution to position the cam portion such that the post rides up ramp 78. At this point, spring rocker 60 is pivoted on its post 88 against the bias of its spring 90 with the result that end 52 of spring follower 54 becomes engaged with scroll plate 42 at the radially inward portion of one of its tracks and is thus in its operable position, as shown in FIG. 4.

Further extension of the shoulder belt webbing causes rotation of shaft 18 and hence scroll plate 42, with end 52 of spring follower 54 moving spirally outward along the track. Further protraction and slight retraction motion results in end 52 being positioned in one of the hooks 50 in a manner described in the aforementioned U.S. Pat. No. 4,002,311. At this point, the rewind force of the shoulder belt retractor rewind spring is blocked out and as a result the tension of the shoulder belt retractor against the occupant's torso is eliminated. The rewind force of a shoulder belt retractor rewind spring may be reestablished by extending the belts such that end 52 of spring follower 54 is moved to the end of the corresponding track, whereby spring action of the follower 54 moves end 52 again to the center of scroll plate 42, as described in the Fisher et al. patent.

In accordance with this invention, when the shoulder and lap belts are released such as occurs by release of the tongue plate from a seat belt buckle assembly by the occupant preparatory to leaving the vehicle, if the tension eliminator for the shoulder belt retractor 16 has not been engaged then both the lap and shoulder belts are wound up by their respective rewind springs in a normal fashion. However, should the tension eliminator be engaged, only lap belt retractor 35 will initially be rotated in the rewind direction due to the force of its rewind spring and lap belt webbing will initially be wound up. When lap belt retractor shaft 36 has rotated sufficiently in the rewind direction so that the lap belt is almost in a fully stowed position on spool 40, ring gear 74 has been rotated via the gear train established between spur gear 62, idler gear 70 and the internal teeth of the ring gear 74 to a circumferential position at which boss 96 of spring rocker 60 rides down ramp 78 from cam portion 76 to valley 80 on the face of ring gear 74. As a result, spring rocker 60 is pivoted on its post 88 with the upper portion of spring rocker 60 being moved away from scroll plate 42 due to the bias of spring 90, whereby end 52 of spring follower 54 is moved and held away from scroll plate 42. The tension elimination mechanism is thus deactivated and the shoulder belt is rewound onto spool 22 due to the force of the shoulder belt retractor rewind spring. Thus, energy is stored in spring 90, which is compressed as a result of rotation of the lap belt retractor in the extraction direction. The comfort mechanism is moved to its inoperable position due to release of the stored energy as spring 90 expands after the lap belt retractor has been rotated sufficiently in the rewind direction.

It can be seen that the present invention provides a dual spool seat belt retractor which includes a comfort mechanism feature for the shoulder belt retractor which is independent of actuation of vehicle door and as much may be mounted at any desired location in the vehicle, such as on a seat of a vehicle. In addition, the comfort mechanism is automatically disengaged due to the rewind movement of the lap belt retractor and as such the entire webbing is moved to a fully stowed position without the use of a door actuated mechanism.

It is to be understood that variations and modifications of the present invention may be made without departing from the scope thereof. It is also to be understood that the present invention is not to be limited by the specific embodiments herein but only in accordance with the appended claims when read in light of the foregoing specification.

We claim:

1. In a dual spool seat belt retractor including a housing, a lap belt retractor mounted in said housing and adapted to store a lap belt thereon, said lap belt retractor having a shaft, a shoulder belt retractor mounted in said housing and adapted to store a shoulder belt thereon, said retractors being rotatable in rewind and extraction directions, and rewind means associated with said retractors and normally exerting a rewind force urging said retractors towards the rewind direction, the improvement comprising:

tension relieving means operatively associated with said shoulder belt retractor and effective in an operable position to relieve the rewind force associated with said shoulder belt retractor and ineffective in an inoperable position to relieve said force; and release means operable to position said tension relieving means in its inoperable position, said release means comprising a gear mechanism coupled to said shaft for actuating said release means in response to rotation of said lap belt retractor in said rewind direction and being actuatable to position said tension relieving means in its operable position in response to rotation of said lap belt retractor in said extraction direction, said gear mechanism including contact means for positioning said tension relieving means in its operable and inoperable positions, said tension relieving means including first and second members, said second member being coupled to said shoulder belt retractor, said first member adapted to engage said second member to effect said relief of said rewind force, and a pivotable member in contact with said first member and said contact means of said gear mechanism and effective to control engagement of said first and second members, and means biasing said pivotable member so that said first member is held away from said second member when said lap belt is fully wound up on said lap belt retractor.

2. The dual spool retractor of claim 1 wherein said gear mechanism includes a ring gear and said contact means is provided on said ring gear.

3. The dual spool retractor of claim 1 wherein said contact means on said gear mechanism comprises an outwardly extending surface including an elevated portion and a recessed portion, said pivotable member including a surface in contact with said elevated and recessed portions, contact of said surface and said elevated portion effective to move said pivotable member towards said second member against the bias of said biasing means whereby said tension relieving means is in its operable position and wherein contact of said surface with said recessed portion being effective to permit said pivotable member to move away from said second member due to the bias of said biasing means whereby said tension relieving means is in its inoperable position.

4. The dual spool retractor of claim 2 including a shaft for said shoulder belt retractor and wherein said second member of said tension relieving means is coupled with said shaft of said shoulder belt retractor, engagement of said first member with said second member of said tension relieving means preventing rotation of said shoulder belt retractor in its rewind direction.

5. The dual spool retractor of claim 4 wherein said first member comprises an elongated spring follower having one end adapted to contact said second member and said second member comprises a rotatable scroll plate having a plurality of tracks and hooks, said one end of said spring follower being movable in said tracks and into said hooks.

6. The dual spool retractor of claim 5 wherein said pivotable member comprises a housing for said spring follower and wherein said biasing means biases said housing away from said scroll plate.

7. The dual spool retractor of claim 6 wherein said contact means on said ring gear comprises an outwardly extending surface including an elevated portion and a recessed portion, said pivotable member including a surface in contact with said elevated and recessed portions, contact of said surface and said elevated portion effective to move said housing towards said scroll plate against the bias of said biasing means whereby said tension relieving means is in its operable position and wherein contact of said surface with said recessed portion being effective to permit said housing to move away from said scroll plate due to the bias of said biasing means whereby said tension relieving means is in its inoperable position.

8. A dual spool retractor of claim 7 wherein said surface of said pivotable member is in contact with said recess portion when said lap belt is stored on said lap belt retractor and is movable into contact with said elevated portion upon rotation of said lap belt retractor in the extraction direction.

* * * * *